United States Patent [19]

Yoshie

[11] Patent Number: 4,920,521
[45] Date of Patent: Apr. 24, 1990

[54] METHOD AND SYSTEM FOR INTERPOLATION-PROCESSING DELAY TIME DATA

[75] Inventor: Tsuyoshi Yoshie, Ootawara, Japan

[73] Assignee: Kabushiki Kaisha Toshiba, Kawasaki, Japan

[21] Appl. No.: 159,336

[22] Filed: Feb. 23, 1988

[30] Foreign Application Priority Data

Feb. 24, 1987 [JP] Japan .................................. 62-39154

[51] Int. Cl.⁵ ............................................. G01S 15/06
[52] U.S. Cl. ...................................... 367/103; 73/626;
367/119
[58] Field of Search ....................... 367/103, 119, 138;
342/368, 371; 73/626; 364/577; 128/661.02,
661.01, 660.08

[56] References Cited

U.S. PATENT DOCUMENTS

| | | | |
|---|---|---|---|
| 4,116,229 | 9/1978 | Pering | 73/626 |
| 4,136,388 | 1/1979 | Lindquist | 364/577 X |
| 4,287,768 | 9/1981 | Hayakawa et al. | 73/626 |
| 4,305,296 | 12/1981 | Green et al. | 73/626 |
| 4,310,907 | 1/1982 | Tachita et al. | 73/626 X |

*Primary Examiner*—Thomas H. Tarcza
*Assistant Examiner*—Tod Swann
*Attorney, Agent, or Firm*—Finnegan, Henderson, Farabow, Garrett and Dunner

[57] ABSTRACT

Delay time data for using the transducers arranged within a probe, for transmitting and receiving an ultrasonic beam, is stored in a memory. The amount of this delay time data is less than that required for using all transducers. The delay time data stored in the memory is interpolation-processed, thereby providing additional delay time data. The sum of the delay time data stored in the memory and the additional delay time data obtained by the interpolation-processing suffices to use all the transducers incorporated in the probe.

10 Claims, 5 Drawing Sheets

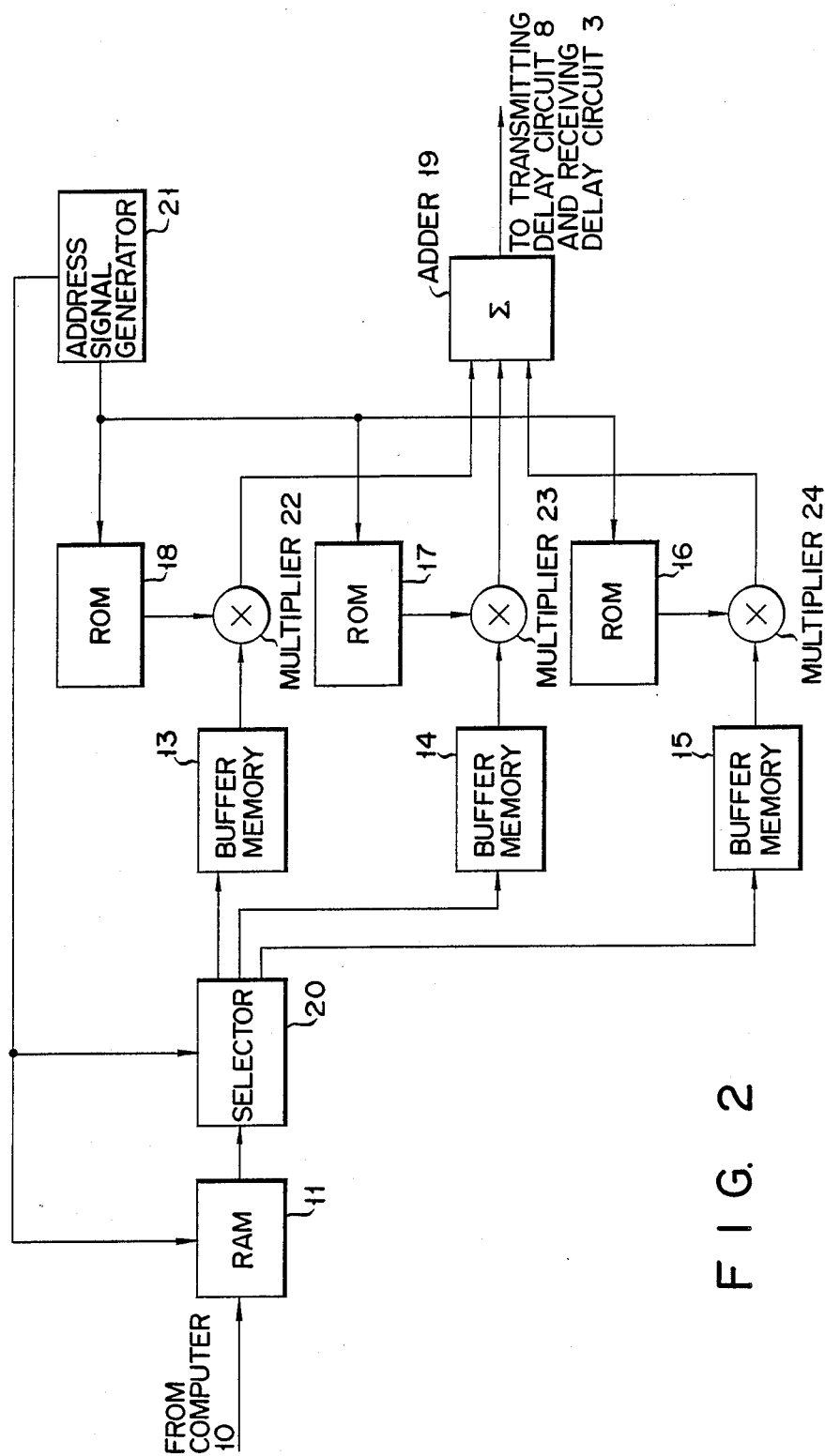
F I G. 2

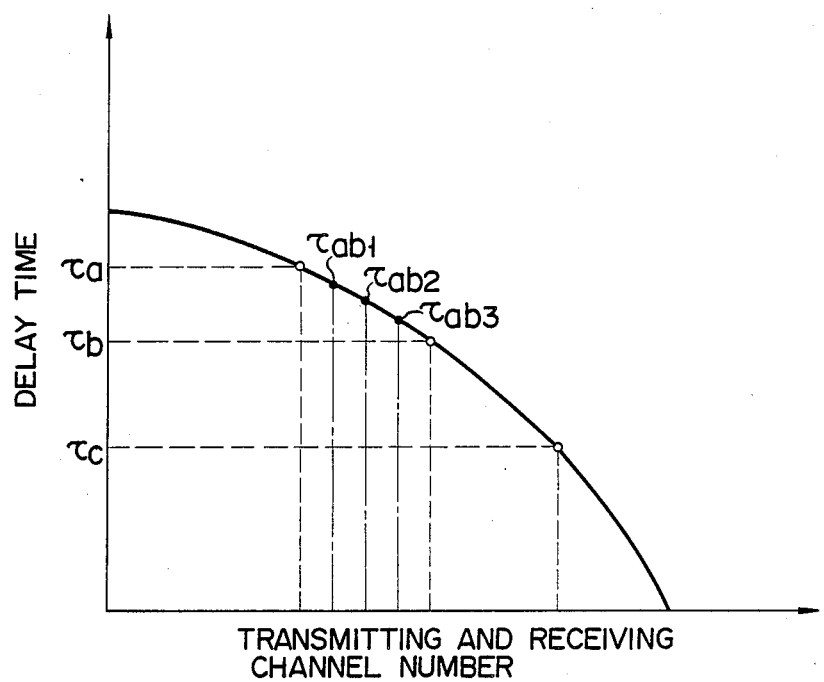
F I G. 3

FIG. 5
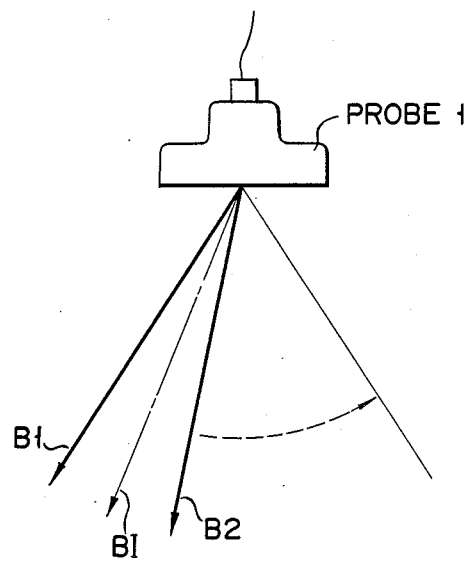
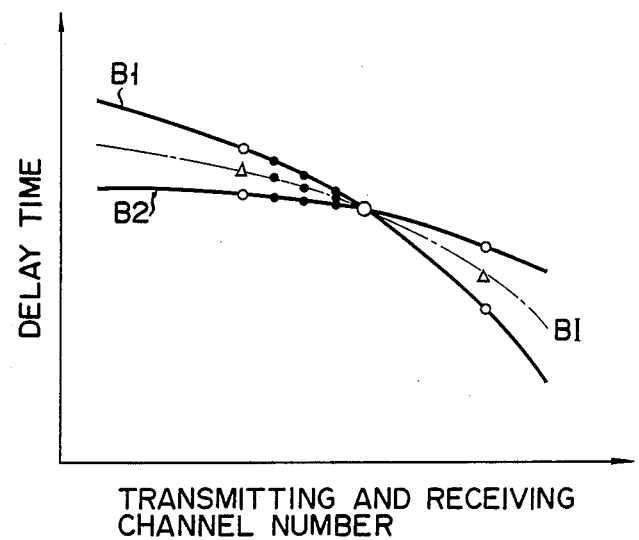
FIG. 6

METHOD AND SYSTEM FOR INTERPOLATION-PROCESSING DELAY TIME DATA

BACKGROUND OF THE INVENTION

1. Field of the Invention

The present invention relates to a method and a system for interpolation-processing delay time data which has been supplied to delay circuits, incorporated in an ultrasonic diagnosis apparatus, for transmitting and receiving ultrasonic beams.

2. Description of the Related Art

An ultrasonic diagnosis apparatus has a delay circuit incorporated in the signal-transmitting system or the signal-receiving system, or both. The signals input to the delay circuit are delayed, and are output to transmitter or receiver, or both. These delay signals are used to operate transducers incorporated in the probe. The probe transmits and receives an ultrasonic beam which is deflected in a desired direction and focused on a desired position.

In order to obtain a tomographic image of a subject by means of such an ultrasonic diagnosis apparatus, various delay time data times required for transmitting and receiving ultrasonic beam are supplied to a delay circuit in accordance with several factors (hereinafter called "delay time-varying factors"), such as the positions of the transducers which must be used, the number of rasters required to form the tomographic image, and the number of focal points.

Hitherto, the delay time required for transmitting and receiving ultrasonic beams has been calculated by a computer, the resultant data being stored in a RAM and read out therefrom, when required, and transferred to the control circuit of the transmitting and receiving system of the ultrasonic diagnosis apparatus. The more delay time-varying factors there are, the greater the amount of delay time data which must be stored in the memory, and hence the larger the capacity the memory must have. When the amount of delay time data required increases in accordance with delay time-varying factors, a number of problems arise, in view of the time needed for transfer of the delay time data, in using the transducers at different times.

Therefore there is a demand for an apparatus which can use all transducers incorporated in a probe, by using a relatively small delay time data even if there are many delay time-varying factors.

SUMMARY OF THE INVENTION

Accordingly, it is the object of the present invention to provide a method and a system for interpolation-processing delay time data which has been supplied to delay circuits, incorporated in an ultrasonic diagnosis apparatus, for transmitting and receiving ultrasonic beams.

According to one aspect of the invention, there is provided a method for interpolation-processing delay time data required for transmitting and receiving ultrasonic beams. The method comprises the steps of setting delay time data; interpolation-processing the set delay time data, thereby providing additional delay time data; and outputting the set delay time data and the additional delay time data.

According to another aspect to the invention, there is provided a system for interpolation-processing delay time data required for transmitting and receiving ultrasonic beams. The system comprises means for storing the delay time data; means for interpolation-processing the stored delay time data, thereby providing additional delay time data; and means for outputting the stored delay time data and the additional delay time data.

BRIEF DESCRIPTION OF THE DRAWINGS

FIG. 2 is a block diagram of the delay time data setting circuit used in the system shown in FIG. 1;

FIG. 3 is a diagram explaining how the circuit shown in FIG. 2 interpolates delay time data;

FIG. 5 is a diagram explaining how to interpolate rasters during raster-scanning a subject; and FIG. 6 is a diagram explaining how the circuit shown in FIG. 4 interpolates delay time data.

DETAILED DESCRIPTION OF THE PREFERRED EMBODIMENT

An embodiment of this invention will now be described, with reference to the accompanying drawings.

Figure 1:
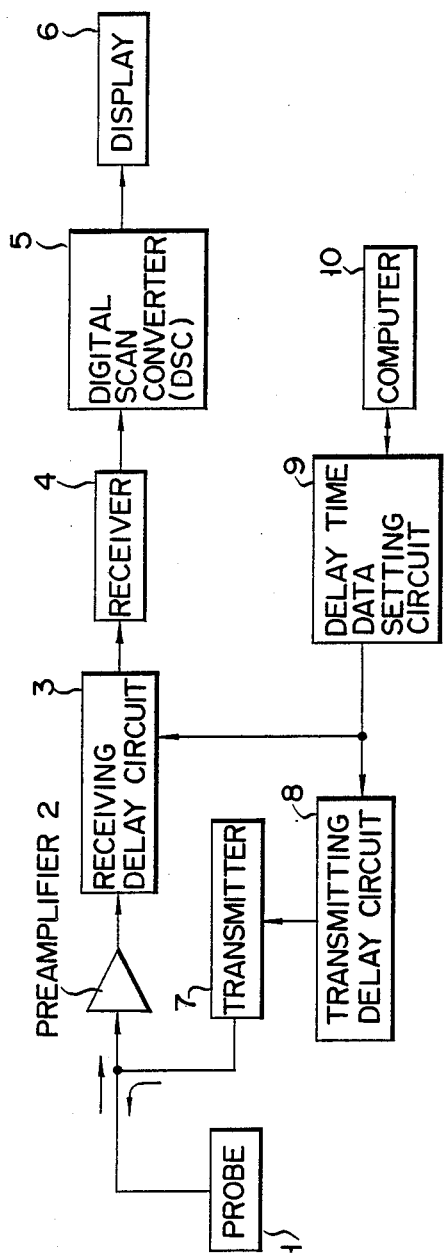
FIG. 1 is a block diagram of a system according to the present invention.

As is shown in FIG. 1, a system according to the present invention comprises probe 1, preamplifier 2, receiving delay circuit 3, receiver 4, Digital Scan Converter (DSC) 5, display 6, transmitter 7, transmitting delay circuit 8, delay time data setting circuit 9, and computer 10.

Probe 1 is designed to transmit an ultrasonic beam to a subject, and to receive the beam reflected from the subject. When probe 1 receives an ultrasonic beam, a plurality of transducers (not shown) incorporated in the probe convert the beam into electric signals. These electric signals are then amplified by preamplifier 2 and input to receiving delay circuit 3. Circuit 3 delays the input signals be predetermined periods of time, and the signals thus-delayed, are input via receiver 4 to DSC 5. The image data output from DSC 5 is supplied from DSC 5 to display 6, which then displays a tomographic image of the subject.

Transmitter 7 operates the transducers incorporated in probe 1, in response to transmitting pulse signals generated by the signal output from transmitting delay circuit 8. These transmitting pulse signals have been delayed by the same predetermined periods of time the output signals of preamplifier 2 have been delayed by receiving delay circuit 3, the data representing these periods of time (hereinafter called "delay time data") is supplied from delay time data setting circuit 9, to circuits 3 and 8 under the control of computer 10.

FIG. 2 is a block diagram illustrating delay time data setting circuit 9. As is shown in this figure, circuit 9 comprises RAM 11, buffer memories 13, 14, and 15, ROMs 16, 17, and 18, adder 19, selector 20, address signal generator 21, and multipliers 22, 23, and 24. RMA 11 is used to store delay time data items required for interpolation-processing. Selector 20 selects the delay time data items read out from RAM 11, and distributes them to buffer memories 13, 14, and 15. ROMs 16, 17, and 18 store interpolation coefficients which are needed for interpolation of the delay time data stored in RAM 11. Multipliers 22, 23, and 24 multiply the delay time data items temporarily stored in buffer memories 13, 14, and 15, by the interpolation coefficients written in ROMs 16, 17, and 18. The resultant data items output by multipliers 22, 23, and 24 are supplied to adder 19, where they are added up, thereby providing the amount of delay time data. This delay time data is supplied to receiving delay circuit 3 and transmitting delay circuit 8. Address signal generator 21 is designed to generate signals for designating the desired addresses of RAM 11 and ROMs 16, 17, and 18. Selector 20 distributes the delay time data items, in accordance with the output signals of address signal generator 21. These output signals are used as select signals of selector 20.

The operation of the system shown in FIG. 1 will now be explained.

Delay time data setting circuit 9 outputs delay time data to receiving delay circuit 3 and transmitting delay circuit 8. Circuit 8 delays transmitting pulse signals by the periods of time represented by the delay time data. The delayed pulse signals are input to transmitter 7 which, in response thereto, outputs drive signals to probe 1, thereby driving the transducers incorporated therein. As a result, probe 1 transmits an ultrasonic beam to a subject, the ultrasonic beam is reflected from the subject, back to probe 1, where it is received by the transducers. The transducers convert the beam into electric signals, which are then amplified and input to receiving delay circuit 3. Circuit 3 delays the signals in accordance with the delay time data supplied from delay time data setting circuit 9, and adds up the signals delayed. The signals added up are input via receiver 4 to DSC 5, where they are processed into image data. The image data is supplied to display 6, which then displays a tomographic image of the subject.

Delay time data setting circuit 9 generates delay time data in a manner described below.

The delay time data, which is used by both the transmitting delay circuit and the receiving delay circuit, is obtained by performing complex calculations, including the computation of trigonometric functions and square roots. As is generally known, the periods delayed to carry out each scan on the subject, are differentiated. Therefore, for example, in FIG. 3 the periods $\tau_{ab1}$, $\tau_{ab2}$ and $\tau_{ab3}$ can be obtained by interpolation, by using periods $\tau_a$, $\tau_b$ and $\tau_c$. Period $\tau_{ab1}$, for instance, can be interpolated in accordance with the following simple equation:

$$\tau_{ab1} = a\tau_a + b\tau_b + c\tau_c \qquad \ldots (1)$$

where a, b and c are interpolation coefficients.

According to the present embodiment, the delay time data supplied from computer 10 is stored in RAM 11. The data stored in RAM 11 is used to interpolate periods $\tau_a$, $\tau_b$, $\tau_c$, and so on. More specifically, delay time data items $\tau_a$, $\tau_b$, and $\tau_c$ are sequentially read out from RAM 11 and stored via selector 20 into buffer memories 13, 14, and 15. When necessary, the delay time data items are read out from buffer memories 13, 14, and 15 and input to multipliers 22, 23, and 24. Multipliers 22, 23, and 24 multiply delay time data items $\tau_a$, $\tau_b$, and $\tau_c$, by interpolation coefficients a, b, and c, respectively. The outputs of multipliers 22, 23, and 24, i.e., weighted data items $a\tau_a$, $b\tau_b$, and $c\tau_c$, are added by adder 19, thereby obtaining data of delay period $\tau_{ab1}$. Other delay period $\tau_{ab2}$ and $\tau_{ab3}$ are interpolated in the same way as delay period $\tau_{ab1}$. A process is performed for delay periods $\tau_a$, $\tau_b$, or $\tau_c$. For example, period $\tau_a$ is stored via selector 20 into buffer memories 13, 14, and 15, and calculated by using interpolation coefficients a, b, and c. That is, $\tau_a = a\tau_a + b\tau_a + c\tau_a$.

As may be understood from the above, the system according to the present invention can interpolate delay time data items stored in RAM 11, which are smaller than the delay data items required to transmit and receive the ultrasonic beam by using all transducers. Hence, RAM 11 need not have capacity large enough to store delay time data items required for using all transducers incorporated in probe 1.

Figure 4:
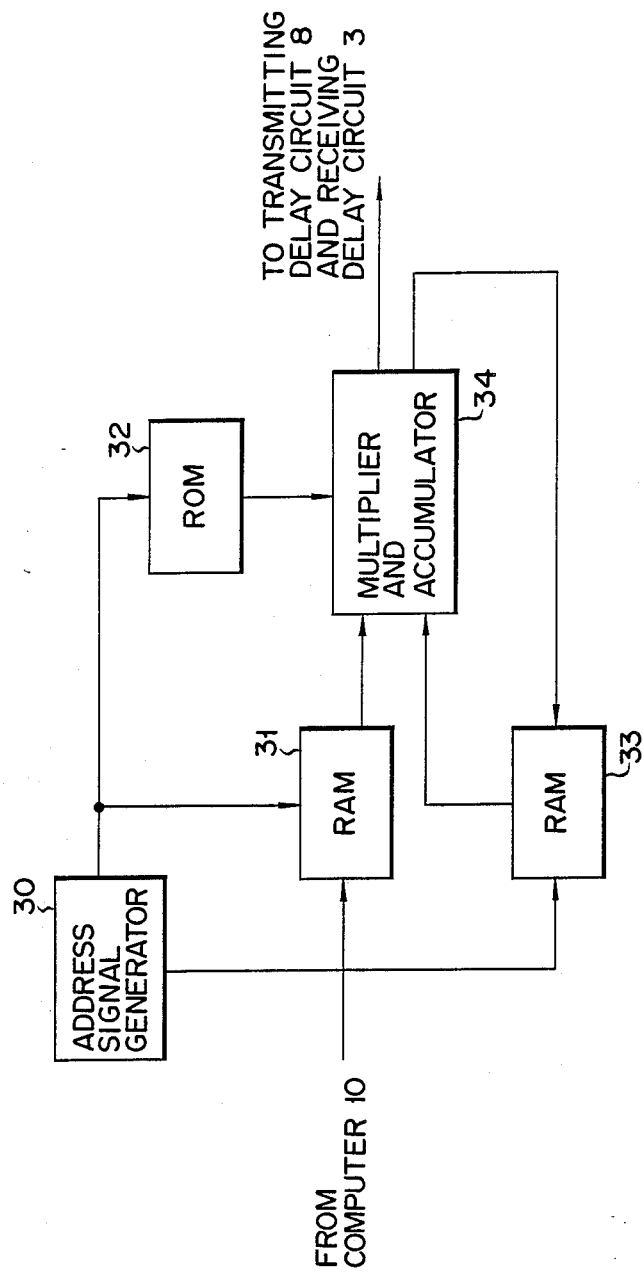
FIG. 4 is a block diagram illustrating another delay time data setting circuit.

Delay time data setting circuit in FIG. 2 can be replaced by the circuit shown in FIG. 4. As is shown in FIG. 4, this circuit comprises address signal generator 30, RAM 31, ROM 32, RAM 33, and multiplier/accumulator 34. RAM 31 stores the delay time data items supplied from computer 10 (FIG. 1), and outputs these data, one another another, to multiplier/accumulator 34. In the meantime, the interpolation coefficients stored in ROM 32 are sequentially input to multiplier/accumulator 34. Multiplier/accumulator 34 multiplies the delay time data items by these interpolation. coefficients, and accumulates the data obtained by this multiplication, thus providing delay time data required for using all transducers incorporated in probe 1 (FIG. 1). The delay time data interpolated is output to receiving delay circuit 3 and transmitting delay circuit 8.

Let us assume that the scan illustrated in FIG. 5 must be carried out. To find the delay time data for scan BI to be performed after scan B1 and before scan B2, the circuit in FIG. 4 is used. More specifically, multiplier/accumulator 34 processes the delay time data items stored in RAM 31, which are represented by small circles in FIG. 6, thereby obtaining the delay time data for scan BI, which is indicated by small triangles in FIG. 6. The process is performed by using a known interpolation equation. The data, thus obtained, is stored into RAM 33. The data for scans B1 and B2 are also stored into RAM 33.

Thereafter, multiplier/accumulator 34 obtains interpolated delay time data represented by small closed circles in FIG. 6, using the delay time data stored in RAM 33.

Address signal generator 30 performs the same function as circuit 21 shown in FIG. 2.

The use of the circuit shown in FIG. 4, in place of circuit in FIG. 2, makes it possible to use a delay time data memory of even smaller capacity.

The present invention is not limited to the embodiment described above. Various changes or modifications can be made without departing the scope of the invention. For instance, RAM 11, which stores the delay time data supplied from computer 10, can be replaced by a ROM. Further, instead of supplying the delay time data to both the transmitting delay circuit and the receiving delay circuit, as in the above embodiment, the delay time data can be supplied to only one of these delay circuits.

What is claimed is:

1. A method for interpolation-processing delay time data utilized for operating a plurality of transducers incorporated in an ultrasonic probe, the method comprising the steps of:
   setting delay time data;
   interpolation-processing the set delay time data by calculating interpolative delay time data on the basis of the set time data; and
   operating the transducers in accordance with the set delay time data and the interpolative delay time data.

2. A method according to claim 1, wherein amounts of the set delay time data are fewer than amounts of delay time data corresponding to the plurality of transducers operated for obtaining an ultrasonic image.

3. A method according to claim 1, wherein the step of interpolation-processing includes the steps of:
   setting interpolation coefficients; and
   the step of interpolation-processing includes calculating the interpolative delay time data by using the set delay time data and the interpolation coefficients.

4. A method according to claim 3, wherein the step of calculating the interpolative delay time data includes the steps of;
   multiplying the set delay time data by the interpolation coefficients; and
   adding the multiplied set delay time data.

5. A method according to claim 1, wherein the interpolation-processing step includes the steps of calculating delay time data of an interpolation scan line between a first scan line and a second scan line.

6. A system for interpolating-processing delay time data utilized for operating a plurality of transducers incorporated in an ultrasonic probe, the system comprising:
   the plurality of transducers;
   storing means for storing delay time data;
   interpolation-processing means for interpolation-processing the stored delay time data by calculating interpolative delay time data on the basis of the delay time data; and
   operating means for operating the transducers in accordance with the delay time data and the interpolative delay time data.

7. A system according to claim 6, wherein amounts of the delay time data stored in the storing means are fewer than amounts of delay time data corresponding to the plurality of transducers operated for obtaining an ultrasonic image.

8. A system according to claim 6, wherein the interpolation-processing means includes;
   means for storing interpolation coefficients; and
   means for calculating the interpolative delay time data by using the delay time data and the interpolation coefficients.

9. A system according to claim 8, wherein the calculating means includes;
   means for multiplying the delay time data by the interpolation coefficients; and
   means for adding the multiplied delay time data.

10. A system according to claim 6, wherein the interpolation-processing means includes means for calculating delay time data of an interpolation scan line between a first scan line and a second scan line.

* * * * *

UNITED STATES PATENT AND TRADEMARK OFFICE
CERTIFICATE OF CORRECTION

PATENT NO. : 4,920,521
DATED : April 24, 1990
INVENTOR(S) : Tsuyoshi Yoshie

It is certified that error appears in the above-identified patent and that said Letters Patent is hereby corrected as shown below:

Claim 1, line 65, column 4, insert --delay-- after set.

Claim 3, line 6, column 5, change "steps" to --step--.

Signed and Sealed this

Thirteenth Day of October, 1992

Attest:

DOUGLAS B. COMER

*Attesting Officer*  *Acting Commissioner of Patents and Trademarks*